(12) United States Patent
Janicek

(10) Patent No.: US 6,666,055 B2
(45) Date of Patent: Dec. 23, 2003

(54) SEQUENTIALLY UNLOCKING EXPANSION SLOTS

(75) Inventor: Michael Janicek, Sioux City, IA (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 10/171,217

(22) Filed: Jun. 12, 2002

(65) Prior Publication Data

US 2002/0152779 A1 Oct. 24, 2002

Related U.S. Application Data

(62) Division of application No. 09/378,316, filed on Aug. 20, 1999.

(51) Int. Cl.$^7$ .............................................. E05B 49/00
(52) U.S. Cl. ................ 70/278.1; 312/223.1; 312/265.6; 312/223.2; 361/759; 361/686; 211/13.1; 174/35 R
(58) Field of Search ...................... 70/278.1, 278.7, 70/265, 277, 58; 361/683, 686, 796, 801, 759, 740, 724–727; 312/183, 187, 193.4, 265.6, 223.1, 223.2; 211/13.1, 41.17, 187.1; 248/22.1, 26, 27.1, 674; 174/35 R

(56) References Cited

U.S. PATENT DOCUMENTS

| | | | | | |
|---|---|---|---|---|---|
| 699,597 | A | * | 5/1902 | Walsh ........................... | 70/265 |
| 1,134,625 | A | * | 4/1915 | Locke ........................... | 70/265 |
| 2,166,058 | A | * | 7/1939 | Kirk .............................. | 70/265 |
| 2,166,061 | A | * | 7/1939 | Kirk .............................. | 70/265 |
| 3,124,397 | A | * | 3/1964 | Braunsberg .................... | 70/265 |
| 3,327,169 | A | * | 6/1967 | Comstock ..................... | 70/265 |
| 5,004,867 | A | * | 4/1991 | Mast ......................... | 174/35 G |
| 5,191,514 | A | * | 3/1993 | Kabat et al. ................. | 361/415 |
| 5,225,825 | A | * | 7/1993 | Warren .................. | 340/825.31 |
| 5,228,319 | A | * | 7/1993 | Holley et al. ................... | 70/58 |
| 5,237,690 | A | * | 8/1993 | Bealkowski et al. ......... | 395/700 |
| 5,317,483 | A | * | 5/1994 | Swindler ..................... | 361/801 |
| 5,359,322 | A | * | 10/1994 | Murray ..................... | 70/278 X |
| 5,575,546 | A | * | 11/1996 | Radloff ........................ | 361/683 |
| 5,588,317 | A | * | 12/1996 | Bianco .......................... | 70/265 |
| 5,601,349 | A | * | 2/1997 | Holt ........................ | 312/265.6 |
| 5,694,291 | A | * | 12/1997 | Feightner ..................... | 361/683 |
| 5,749,253 | A | | 5/1998 | Glick et al. | |
| 5,757,618 | A | * | 5/1998 | Lee .............................. | 361/686 |
| 5,941,106 | A | * | 8/1999 | Williamson et al. ........ | 70/278.1 |
| 6,160,712 | A | * | 12/2000 | Itai et al. ..................... | 361/759 |
| 6,173,843 | B1 | * | 1/2001 | Christensen et al. ..... | 361/759 X |
| 6,175,491 | B1 | * | 1/2001 | Park ............................ | 361/686 |
| 6,181,565 | B1 | * | 1/2001 | Schmitt et al. .......... | 361/683 X |
| 6,182,835 | B1 | * | 2/2001 | Chen .......................... | 211/13.1 |
| 6,215,668 | B1 | * | 4/2001 | Hass et al. .................... | 361/759 |
| 6,246,585 | B1 | * | 6/2001 | Gunther et al. .............. | 361/759 |
| 6,278,614 | B1 | * | 8/2001 | Beaman et al. .............. | 361/752 |
| 6,350,140 | B1 | * | 2/2002 | Gallagher et al. ....... | 361/801 X |
| 6,367,897 | B1 | * | 4/2002 | Bass et al. ................ | 312/223.2 |
| 6,404,651 | B1 | * | 6/2002 | Martin et al. ................ | 361/801 |
| 6,421,247 | B1 | * | 7/2002 | Fuchimukai ................. | 361/759 |
| 6,430,056 | B1 | * | 8/2002 | Chen ........................... | 361/759 |
| 6,529,382 | B2 | * | 3/2003 | Terao .......................... | 361/726 |

* cited by examiner

*Primary Examiner*—Suzanne Dino Barrett
(74) *Attorney, Agent, or Firm*—Scott Charles Richardson; Rodney L. Lacy; Schwegman Lundberg Woessner & Kluth

(57) ABSTRACT

A lockout apparatus for a number of expansion slots in a printed circuit board includes a lockout mechanism for the expansion slots. Each lockout mechanism includes a lockout member movable between a first position in which its respective expansion slot is blocked, and a second position in which its respective expansion slot is open. Only a single expansion slot is available for use at any one time. In another embodiment, add-on card installed into expansion slots may be retained in the expansion slot when the next expansion slot is filled.

33 Claims, 15 Drawing Sheets

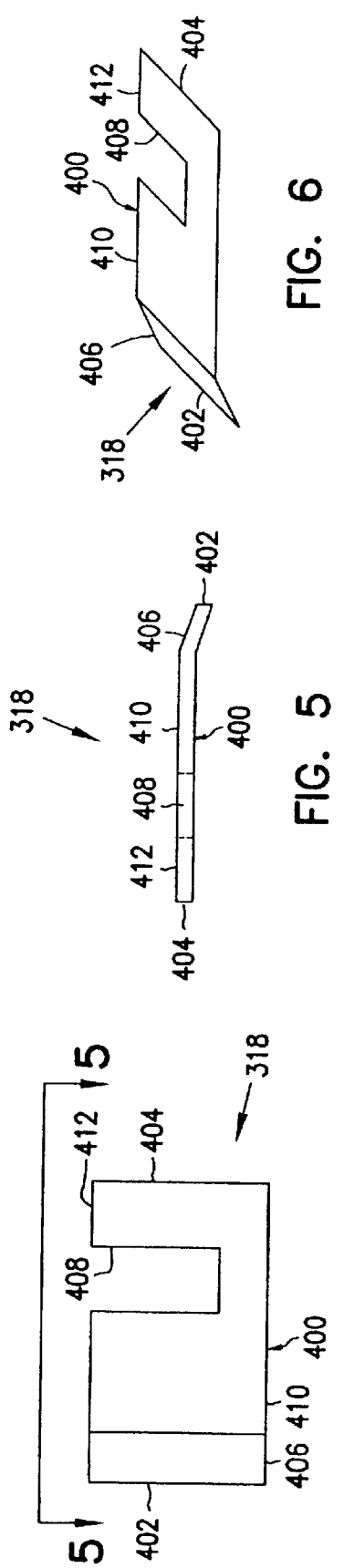

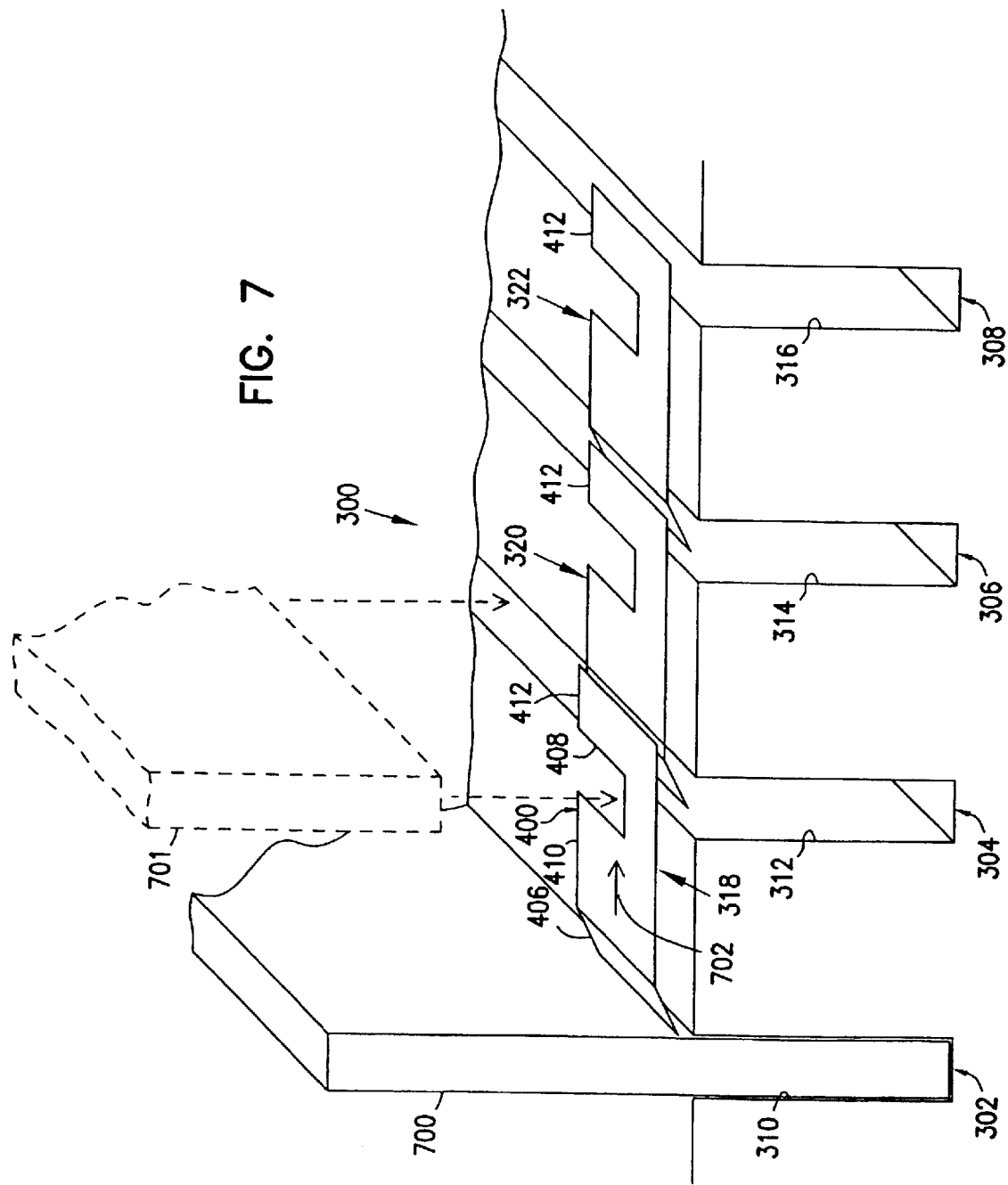

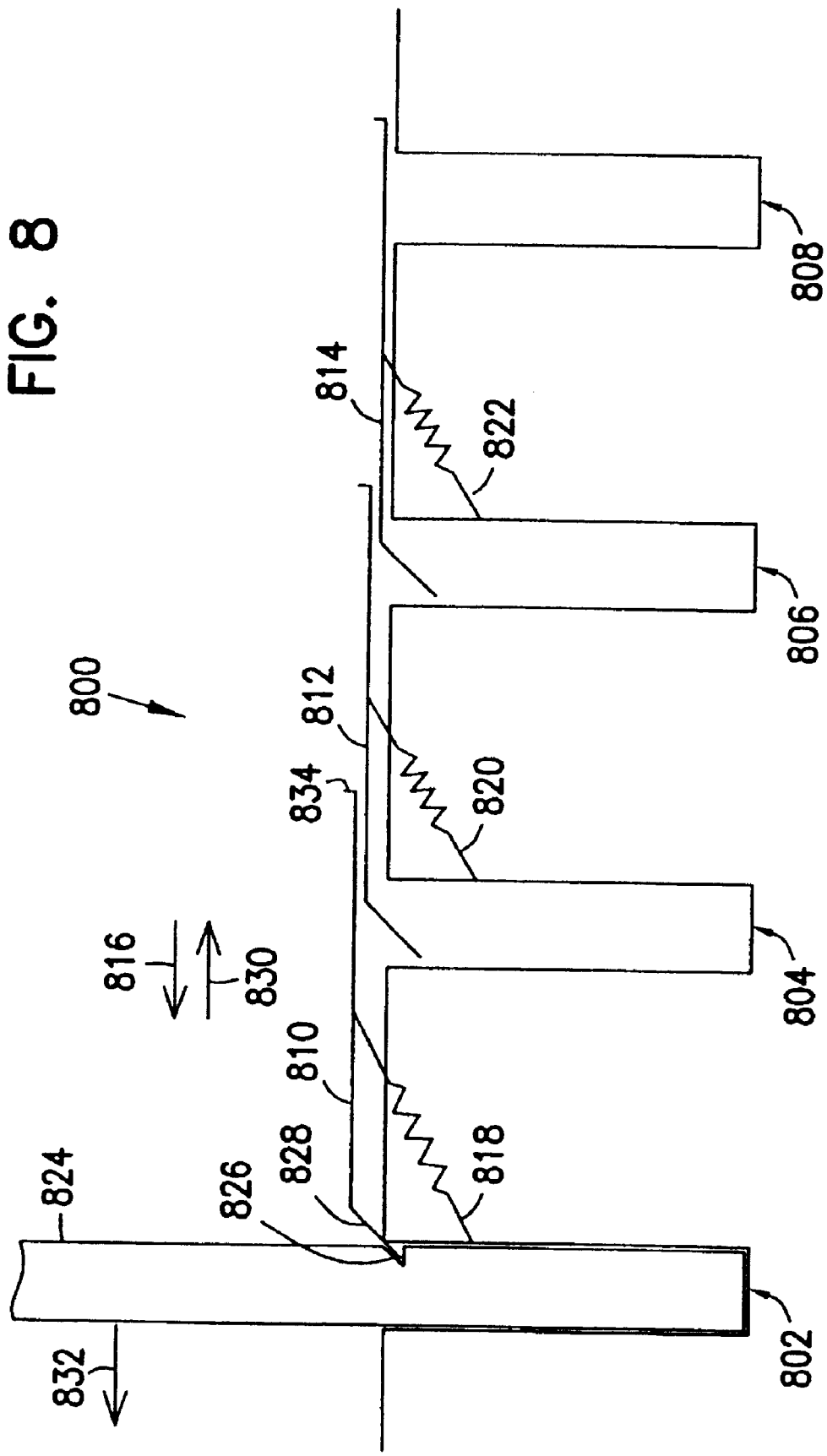

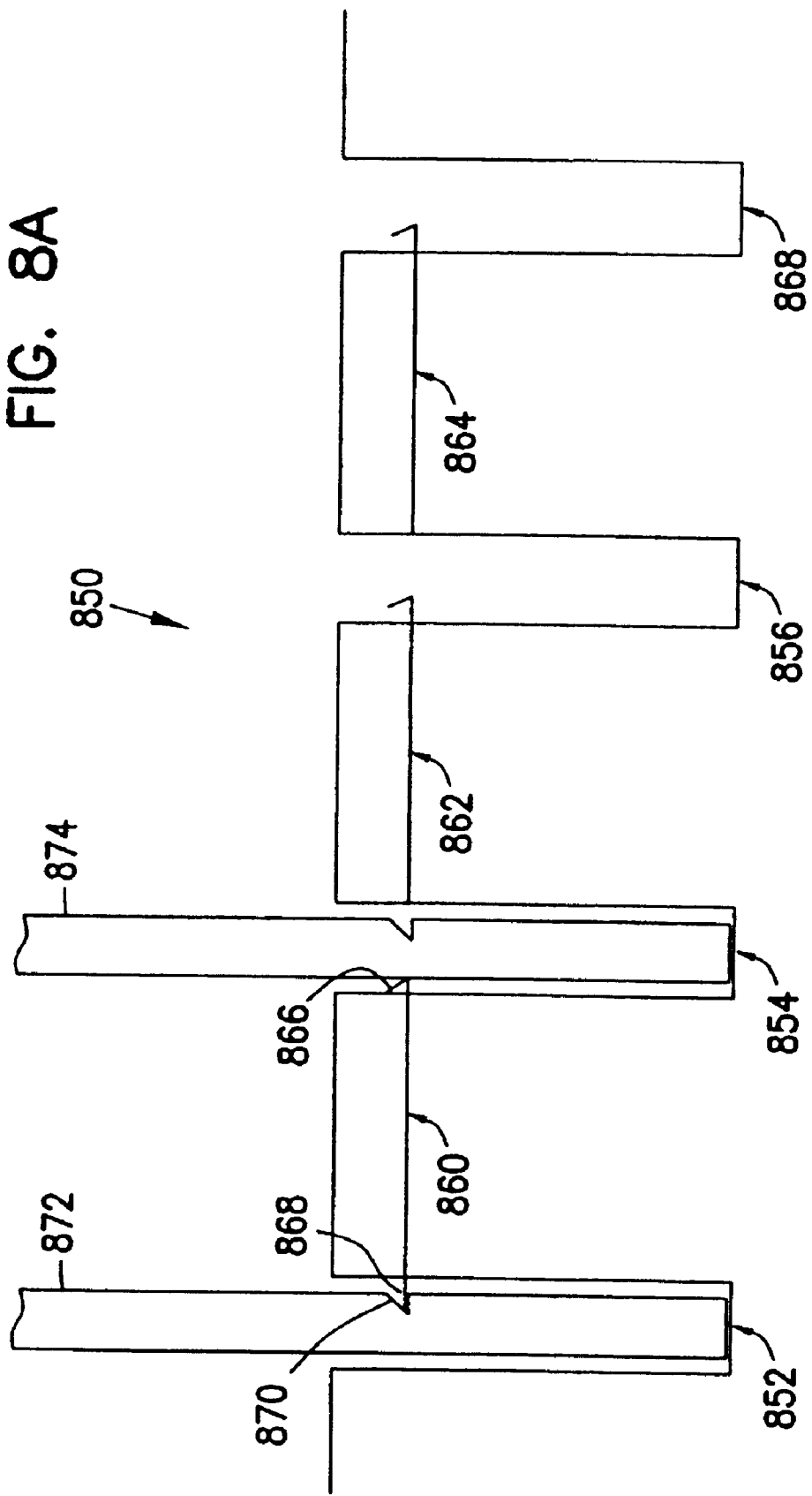

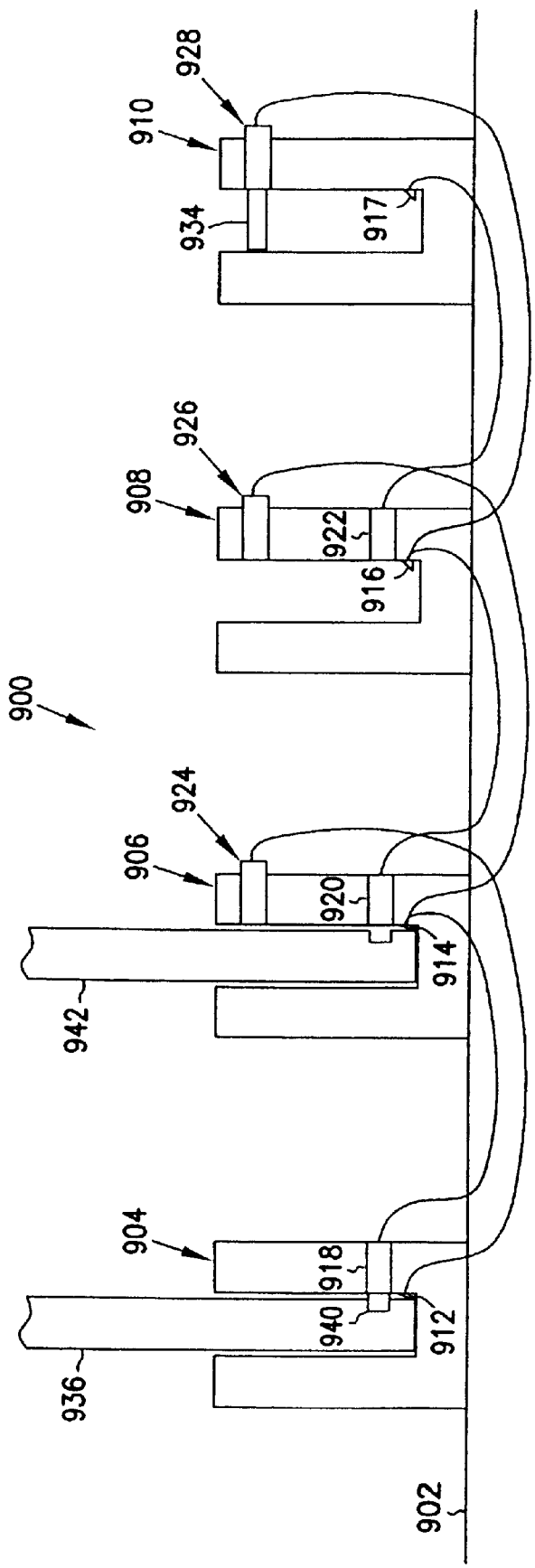

SEQUENTIALLY UNLOCKING EXPANSION SLOTS

RELATED APPLICATION

This application is a divisional of U.S. application Ser. No. 09/378,316 filed Aug. 20, 1999, which application is incorporated herein by reference.

FIELD

The present invention is related generally to printed circuit boards, and more specifically to expansion slots for printed circuit boards.

BACKGROUND

Modern personal computers include an increasing number of separate internal peripheral devices and components. Representative peripheral devices include, but are not limited to, internal modems, sound cards, video adapters, graphics accelerators, accelerator boards, and the like. Representative components include, but are not limited to, cache chips, memory chips, and hard drives.

Typically, peripheral components in a computer system are connected to a printed circuit board (PCB) such as a motherboard or the like through a bus. For example, buses such as Peripheral Component Interconnect (PCI), Industry Standard Architecture (ISA), and Extended ISA (EISA) bus slots are used in computer systems for connection of peripherals such as sound and video cards, modems, and the like. The boards inserted into the expansion slots may be called expansion boards, expansion cards, cards, add-ins, add-ons, and the like.

In addition to PCI, ISA, and EISA expansion slots, other expansion slots in PCBs may be used for adding new capabilities to the computer such as adding more memory, graphics capabilities, and support for special devices. In certain instances, add-on devices such as single in-line memory modules (SIMMs), dual in-line memory modules (DIMMs) and other expansion cards in computers having multiple expansion slots must be installed in a correct sequence for proper function of the device and the computer after installation of the device.

In computer systems and expansion slots in which the correct sequence of installation of add-ons is required, current industry standard practice is to rely on the user to read an instruction set, either at the expansion slot or in a separate manual, or to label the expansion slots in the required order of use. Such practice is unreliable, as many users do not know that certain expansion add-ons must be correctly sequenced in multiple slots. Further, many users do not attempt to verify that the proper methods are being used to install add-ons. It is only after the computer does not function properly that many users turn to additional guidance such as a manual or instruction set.

It would be desirable, therefore, to provide expansion slots that must be used in the proper order.

SUMMARY

The embodiments of the present invention overcome the problems of the prior art by providing a set of expansion slots in a computer in which the only available slot for placement of an add-on is the proper slot. In one embodiment, such a set of expansion slots includes a mechanical lockout mechanism with a cascading set of components that allows access to only the appropriate slot at any given time. Once the current appropriate expansion slot is filled, the next available correct expansion slot becomes available.

In another embodiment, a lockout apparatus for a plurality of expansion slots including a first and last slot, and intermediate slots, includes a number of lockout mechanisms, one for each of the intermediate expansion slots and the last expansion slot. Each lockout mechanism has a lockout member movable between a first position in which its respective expansion slot is blocked, and a second position in which its respective expansion slot is open. Each of the lockout mechanisms includes a lockout disk rotatable about a central point, the lockout disk having a lockout member fixedly rigidly attached to the lockout disk, the lockout member extending into its respective expansion slot, a lockout opening aligned with the lockout channel when the lockout member is in its first position, and a lockout rod rotatably mounted to the lockout disk. The lockout rod extends into the lockout channel and lockout opening of the adjacent expansion slot when the lockout member is in its first position, and movable out of the lockout opening of the adjacent expansion slot when the lockout member moves to its second position.

In yet another embodiment, each of the lockout mechanisms includes a body having a first end and a second end, a displacement tab extending from the first end, and an add-on card opening positioned between the first end and the second end.

In still yet another embodiment, each of the lockout mechanisms includes a power supply, a switch with a contact disposed in a first expansion slot, and a lockout solenoid in a second expansion slot, the switch connected between the power supply and the lockout solenoid, wherein actuation of the switch actuates the lockout solenoid to retract a lockout member from the second expansion slot.

A method embodiment of the present invention includes blocking access to all but the first of the plurality of expansion slots, and opening access to the next of the plurality of expansion slots upon installation of an add-on card into the first of the expansion slots.

BRIEF DESCRIPTION OF THE DRAWINGS

FIG. 4 is a top view of an embodiment of a lockout mechanism of FIG. 3;

FIG. 5 is a view of the lockout mechanism embodiment of FIG. 4 taken along lines 5—5 thereof;

FIG. 6 is a perspective view of the lockout mechanism embodiment of FIG. 4;

FIG. 7 is a perspective view of the embodiment of FIG. 3 with an expansion add-on in place;

FIG. 8 is a side elevation view of yet another embodiment of the present invention;

FIG. 8A is a side elevation view of still another embodiment of the present invention;

FIG. 9B is a side elevation view of the embodiment of FIG. 9 with a second expansion add-on in place;

DESCRIPTION OF EMBODIMENTS

In the following detailed description of the embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
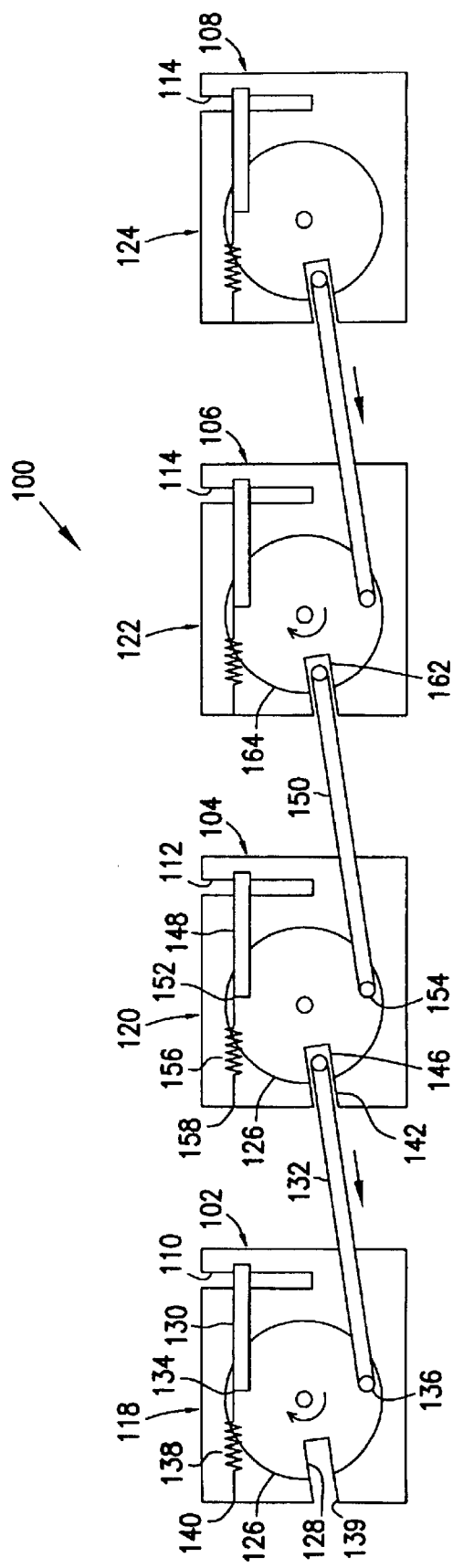
FIG. 1 is a side elevation view of an embodiment of the present invention.

FIG. 1 shows a view of one embodiment 100 of a lockout mechanism for expansion slots. Lockout mechanism 100 comprises in one embodiment four expansion slots 102, 104, 106, and 108, each expansion slot having an add-on opening 110, 112, 114, and 116, respectively, capable of accommodating an add-on such as a memory chip or the like. Each expansion slot 102, 104, 106, and 108 also has a lockout mechanism 118, 120, 122, and 124, respectively. Initially, with all of the expansion slots 102, 104, 106, and 108 empty, only expansion slot 102 is capable of receiving an add-on or expansion card. Lockout mechanism 118 is movable, by the insertion of an add-on or expansion card into expansion or add-on slot 102, between a first, available position in which an expansion card or add-on may be inserted into expansion slot 102 to a second, locked position in which an expansion card is positioned in expansion slot 102.

The lockout mechanisms 118, 120, 122, and 124 are cascading lockout mechanisms. Lockout mechanism 118 of expansion slot 102 comprises a lockout disk 126 having a lock opening 128, a lockout member 130, and a lockout rod or bar 132. Lockout member 130 is fixedly, rigidly attached to lockout disk 126 at point 134, and extends tangentially from lockout disk 126 into expansion slot 102. Lockout rod 132 is rotatably attached to lockout disk 126 at point 136. The lockout disk 126 is held in an angular position as shown in FIG. 1 by biasing means 138. As shown in FIG. 1, biasing means 138 is a spiral spring connected to the lockout member 130 at point 134 and to the expansion slot 102 at point 140. Expansion slot 102 is shown also with optional lockout rod opening 139.

Lockout rod 132 extends from expansion slot 102 into expansion slot 104. Expansion slot 104 has a lockout channel 142 into which lockout rod 132 extends when the lockout mechanism 118 is in its first, available position. Lockout mechanism 120 of expansion slot 104 comprises a lockout disk 144 having a lock opening 146, a lockout member 148, and a lockout rod 150. Lockout member 148 is fixedly, rigidly attached to lockout disk 144 at point 152, and extends tangentially from lockout disk 144 into expansion slot 104. Lockout rod 150 is rotatably attached to lockout disk 144 at point 154. The lockout disk 144 is held in an angular position as shown in FIG. 1 by biasing means 156. As shown in FIG. 1, biasing means 156 is a spiral spring connected to the lockout member 148 at point 152 and to the expansion slot 104 at point 158.

Expansion slot 108, the last expansion slot shown in FIG. 1, has no need for a lockout rod such as rods 132 and 150, unless slot 108 is not the last expansion slot in the apparatus. Similarly, the first expansion slot 102 does not need to have lock opening 128 or lockout channel 139, as they are unused. The remaining details of expansion slots 106 and 108 are substantially identical to expansion slots 102 and 104, and for purposes of brevity will not be described further herein.

Figure 2:
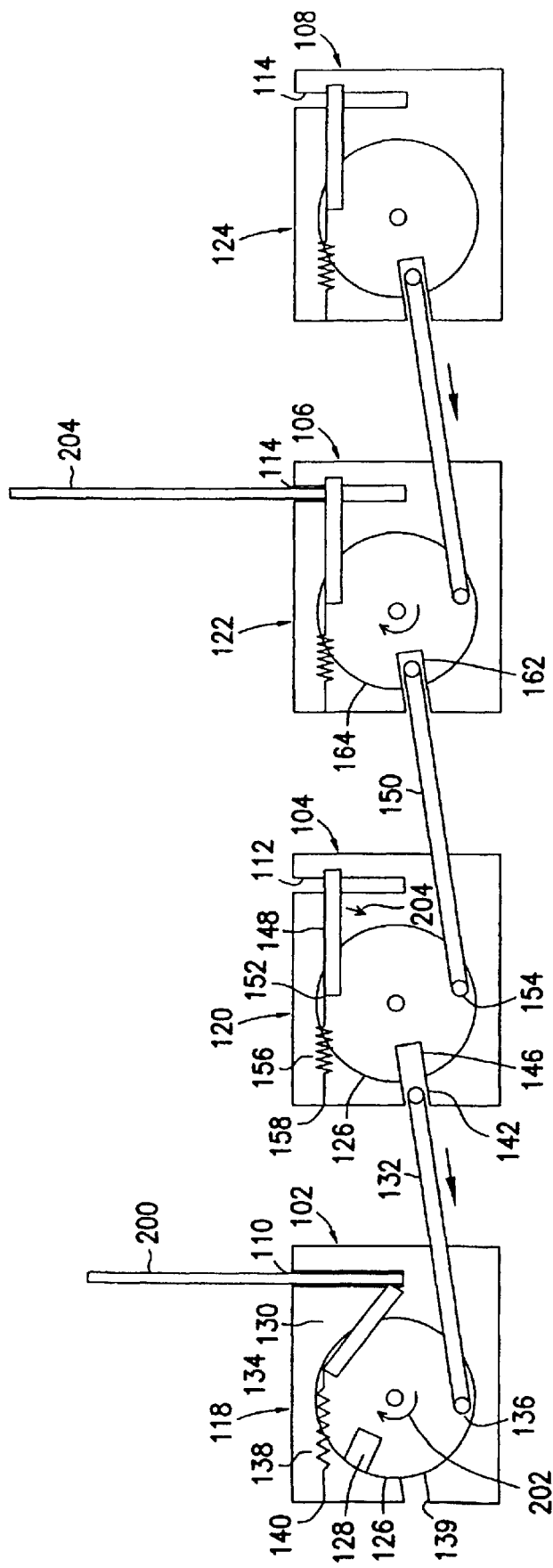
FIG. 2 is a side elevation view of the embodiment of FIG. 1 with an expansion add-on in place.

Referring now also to FIG. 2, expansion slot 102 is shown with an add-on card 200 installed therein. With the installation of add-on card 200, lockout disk 126 rotates in a clockwise direction as indicated by arrow 202, and fixedly attached lockout member 130 is displaced by add-on card 200. The angular movement of lockout disk 126 moves end 160 of lockout rod 132 out of lock opening 146. When this happens, lockout disk 144, previously prevented from rotating by the engagement of lockout rod 132 and lock opening 146, is free to rotate as indicated by arrow 204, and an add-on card is freely installable into expansion slot 104. Lockout rod 150 is still engaged with lock opening 162 of lockout disk 164 of lockout mechanism 122 in expansion slot 106, preventing the insertion or installation of an add-on card such as card 204 into expansion slot 106. Expansion slot 108 is similarly disabled.

Figure 3:
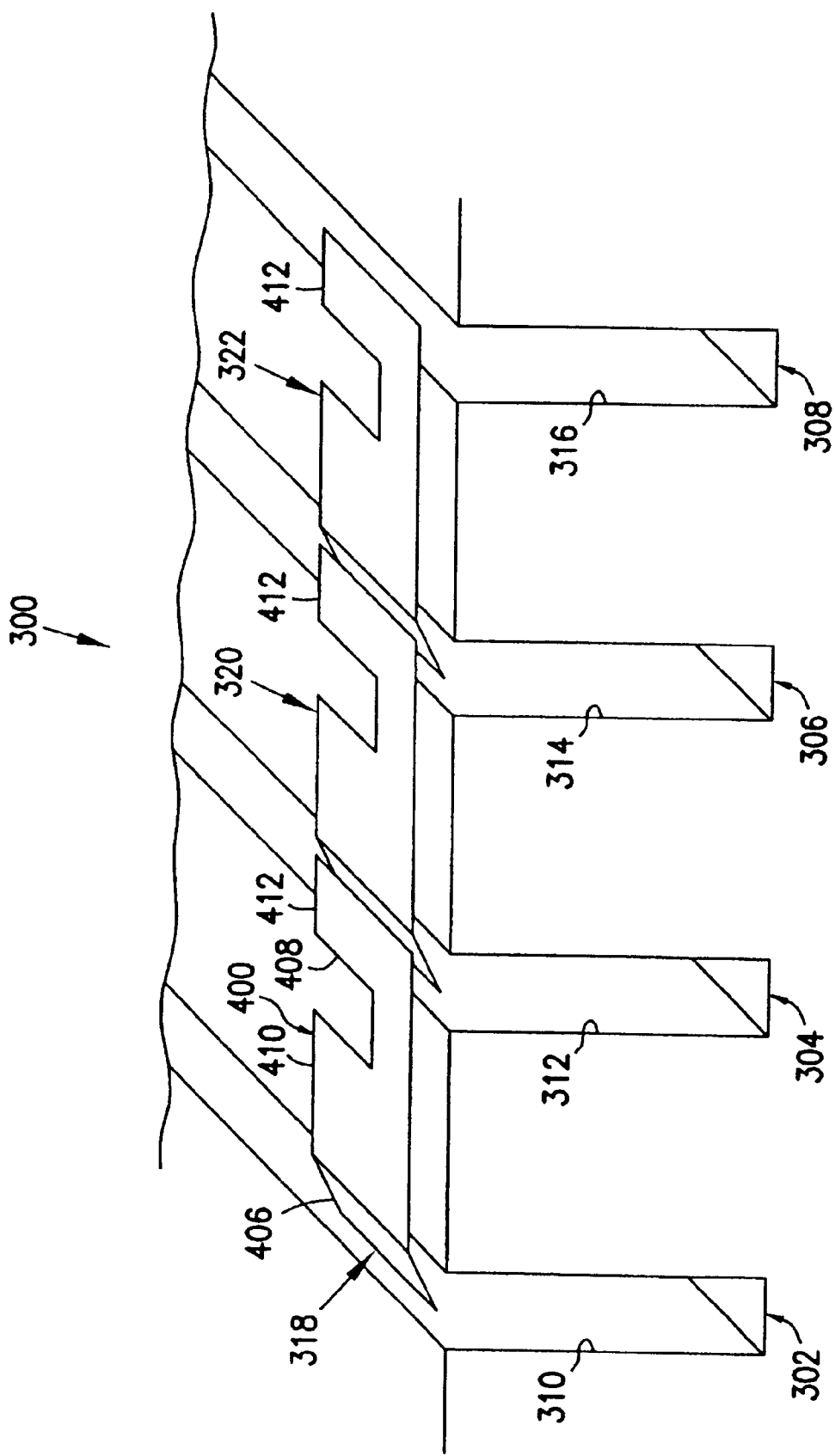
FIG. 3 is a perspective view of another embodiment of the present invention.

In another embodiment of a lockout mechanism shown in FIG. 3, lockout mechanism 300 comprises expansion slots 302, 304, 306, and 308, each expansion slot having a respective add-on opening 310, 312, 314, and 316. A lockout mechanism 318 is positioned over expansion slot 302 and expansion slot 304. Lockout mechanism 320 is positioned over expansion slot 304 and expansion slot 306. Lockout mechanism 322 is positioned over expansion slot 306 and expansion slot 308. Expansion slot 302 is available for installation of an expansion or add-on card. However, each of the remaining expansion slots, 303, 306, and 308, are covered by a section of lockout mechanism 318, 320, and 322, respectively.

The structure of a lockout mechanism embodiment, such as lockout mechanisms 318, 320, and 322, is shown in detail in FIGS. 4, 5, and 6. Since each lockout mechanism 318, 320, and 322 is substantially identical, only one (318) will be described in detail. Lockout mechanism 318 comprises a body 400 having a first end 402 and a second end 404. First end 402 has a displacement tab 406. An add-on card opening 408 is positioned in the body 400 between the ends 402 and 404. Between the add-on card opening 408 and end 404 is a lockout member 412 formed from part of the body 400. In one embodiment, displacement tab 406 is angled with respect to the plane containing surface 410 of body 400.

When in place on a PCB or the like having expansion slots such as slots 302, 304, 306, and 308, a lockout mechanism such as lockout mechanism 318, 320, or 322 is positioned so as to be movable from a first position in which displacement tab 406 is positioned over an add-on opening of a first expansion slot and lockout member 412 is positioned over an add-on opening of a second expansion slot adjacent the first expansion slot, and a second position in which card opening 408 is positioned above the add-on opening of the second expansion slot adjacent the first expansion slot.

As shown in FIG. 3, displacement tab 406 of lockout mechanism 318 is positioned over expansion slot 302, and lockout member 412 is positioned over expansion slot 304. In this position, an expansion or add-on card or chip could be installed into the first expansion slot 302, but not in expansion slot 304 due to its being blocked by lockout member 412 of lockout mechanism 318. Similarly, lockout members 412 of lockout mechanisms 320 and 322 block the installation of an add-on card into expansion slot 306 and expansion slot 308, respectively.

In FIG. 7, an add-on card 700 is shown installed into expansion slot 302. In installation of add-on card 700, lockout member 318 is displaced from its first position as shown in FIG. 3 to its second position. In installation of add-on card 700, add-on card 700 contacts displacement tab 406 of lockout mechanism 318, and during the installation of add-on card 700, displaces lockout mechanism 318 in the direction of arrow 702. When lockout mechanism 318 is displaced as shown, lockout member 412 of lockout mechanism 318 is removed from its position over the expansion slot 304. In this movement of lockout mechanism 318, card opening 408 is moved into position over expansion slot 304. This in turn exposes displacement tab 406 of lockout mechanism 320. In this position, a second add-on card 701 can be freely installed in expansion slot 304.

Since neither lockout mechanism 320 nor lockout mechanism 322 has been moved from its initial position, add-on slots 314 and 316 of expansion slots 306 and 308 are blocked from installation of an add-on card by lockout members 412 of lockout mechanisms 320 and 322, respectively.

In another embodiment 800, shown in side elevation in FIG. 8, expansion slots 802, 804, 806, and 808 are used with lockout mechanisms 810, 812, and 814. Lockout mechanisms 810, 812, and 814 are biased in the direction indicated by arrow 816 by biasing means 818, 820, and 822 respectively. When an add-on card such as add-on card 824 is installed into an expansion or add-on slot such as expansion slot 802, the card 824 pushes the lockout mechanism 810 as has been described above. Biasing means 818, in one embodiment a spiral spring, biases the lockout member 810 in the direction of arrow 816. In one embodiment, add-on card 824 has a notch 826 which the displacement tab 828 of lockout member 810 engages upon installation of the add-on card 824 into expansion slot 802. A force on the lockout member 810 in the direction of arrow 830 or a force on the add-on card 824 in the direction of the arrow 832, or some combination thereof, will then be required to remove add-on card 824 from expansion slot 802. The force on the lockout member may be asserted by use of a release tab 834 located on the lockout member 810.

In FIG. 8A, another embodiment of a means for retaining an add-on card in its expansion slot when an add-on card is installed into the next expansion slot is shown. For purposes of clarity, no further detail is shown. The embodiment 850 works equally well with the lockout apparatus embodiments 100, 300, and 900. In this embodiment 850, expansion slots 852, 854, 856, and 858 have therebetween retention members 860, 862, and 864. Retention member 860 extends between expansion slots 852 and 854, retention member 882 extends between expansion slots 854 and 856, and retention member 864 extends between expansion slots 856 and 858.

Each retention member 860, 862, and 864 is substantially identical to the others. Therefore, only retention member 860 will be described in detail. Retention member 860 is positioned so that its end 866 extends into expansion slot 854 when no add-on card is installed in expansion slot 854. When an add-on card 872 is installed in expansion slot 852, expansion slot 854 becomes available for installation of add-on card 874. When add-on card 874 is installed into expansion slot 854, the add-on card 874 contacts and displaces retention member 860 so that end 868 of retention member extends into slot or recess 870 of add-on card 872, retaining card 872 in expansion slot 852 until add-on card 874 is removed from expansion slot 856.

Figure 9:
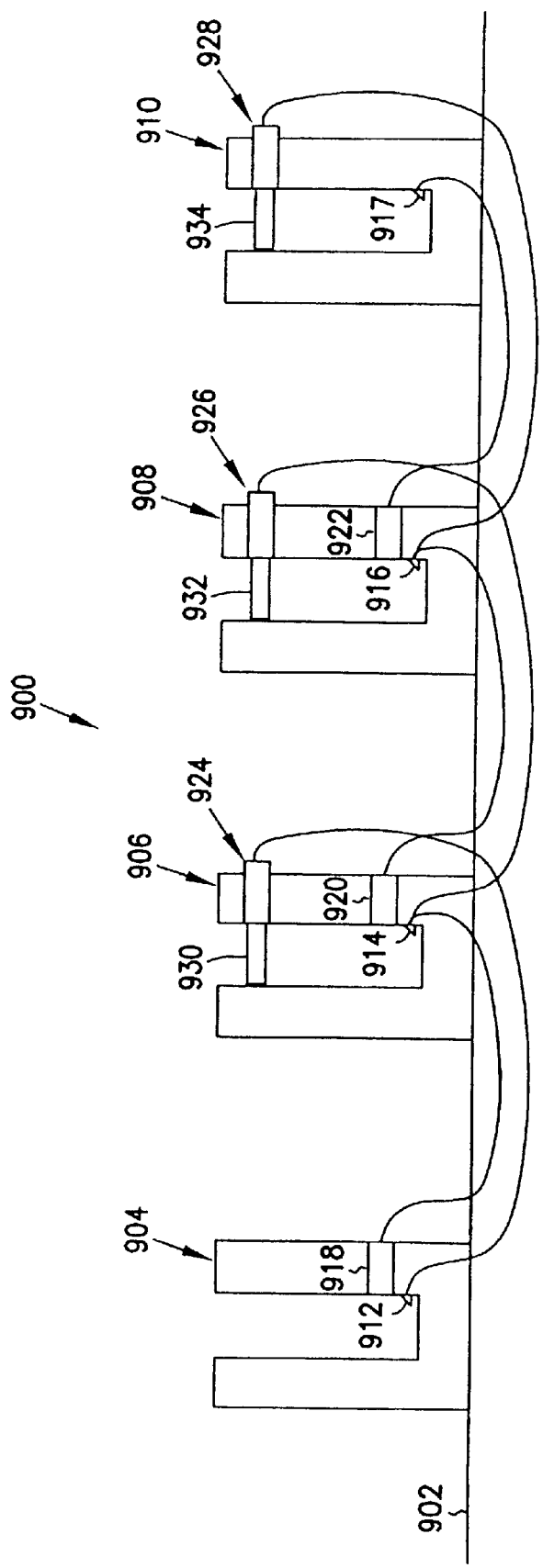
FIG. 9 is a side elevation view of another embodiment of the present invention.

In yet another embodiment shown in FIG. 9, an electronic lockout apparatus 900 for PCB expansion slots comprises a PCB 902 having a plurality of expansion slots 904, 906, 908, and 910. Expansion slots 906, 908, and 910 each have a lockout mechanism 924, 926, and 928 respectively. In one embodiment, each lockout mechanism comprises a solenoid which moves a lockout member between a first position in which the lockout member blocks access to an expansion slot and a second position in which the lockout member is removed from blocking access to the expansion slot.

In FIG. 9, lockout mechanism solenoids 924, 926, and 928 each have a lockout member 930, 932, and 934 respectively. Each lockout member is capable of blocking or of allowing access to expansion slots 904, 906, and 908, respectively. Expansion slots 904, 906, 908, and 910 each have therein a switch 912, 914, 916, and 917, each switch having first and second terminals, each switch having its first terminal connected to a power supply (not shown). Each switch extends into its respective expansion slot. The second terminal of each switch is connected to one or more solenoids as follows. Switch 912 is operatively connected to lockout solenoid 924 of expansion slot 906. Switch 914 is operatively connected to retention solenoid 918 of expansion slot 904 and to lockout solenoid 926 of expansion slot 908. Switch 916 is operatively connected to retention solenoid 920 of expansion slot 906 and to lockout solenoid 928 of expansion slot 910. Switch 917 is operatively connected to retention solenoid 922 of expansion slot 908.

In initial operation of the embodiment 900, lockout members 930, 932, and 934 are in their first position, each lockout member blocking access to its respective expansion slot. While connection to a retention solenoid is shown, it should be understood that sequential access to expansion slots does not depend on physical retention of an add-on card in the expansion slot.

Figure 9A:
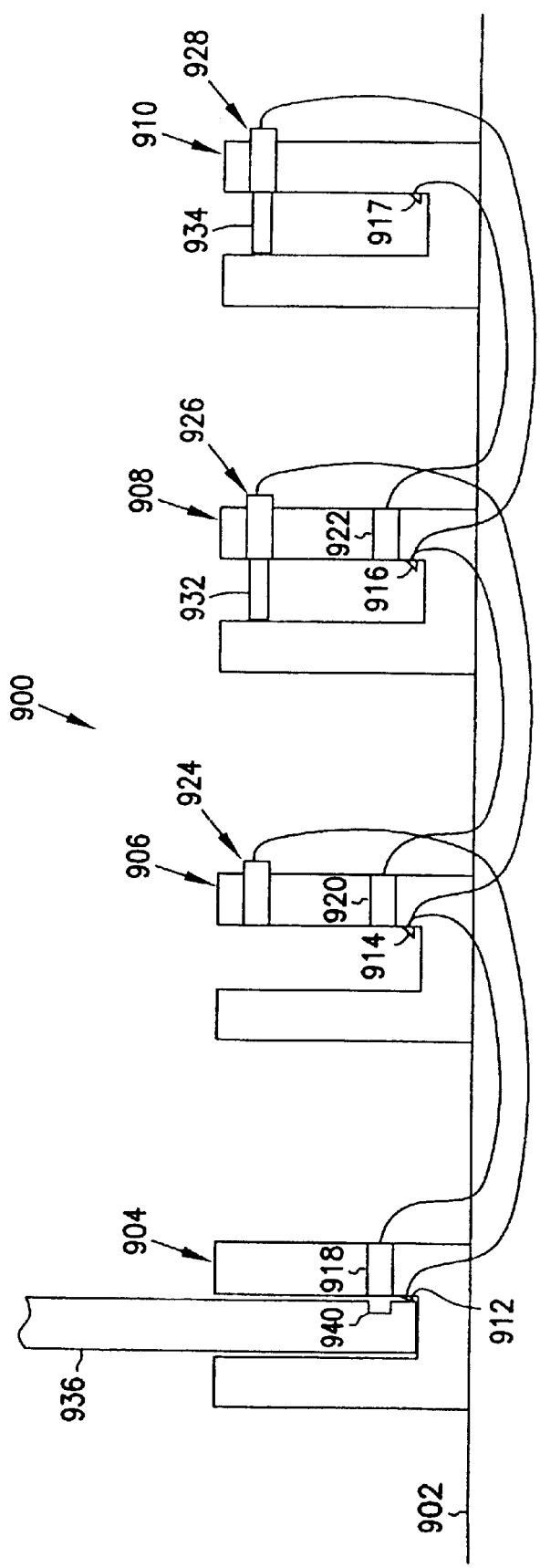
FIG. 9A is a side elevation view of the embodiment of FIG. 9 with an expansion add-on in place.

Referring now also to FIG. 9A, when an add-on card such as add-on card 936 is to be installed into the embodiment 900, the only available expansion slot is expansion slot 904. The remaining expansion slots, 906, 908, and 910, are blocked from access by lockout members 930, 932, and 934 respectively. When add-on card 936 is installed into expansion slot 904, it actuates switch 912 to complete an electric circuit between the power supply and lockout solenoid 924, actuating lockout solenoid 924, causing lockout member 930 to be retracted, allowing free access to expansion slot 906 for a next add-on card to be installed therein. The remaining lockout members 932 and 934 remain in their first positions blocking access to expansion slots 908 and 910 respectively. Add-on card 936, the last add-on card installed into the expansion slots of PCB 902, is freely removable from expansion slot 904 at this point.

In another embodiment shown in FIG. 9B, upon the installation of a second expansion or add-on card into expansion slot 906, switch 914 is actuated. This in turn actuates lockout solenoid 926 to retract lockout member 932, and actuates retention solenoid 918. When actuated, retention solenoid 918 extends retention member 938. A mating opening or recess 940 in add-on card 936 is engaged by retention member 938, retaining add-on card 936 in expansion slot 904. In this embodiment when all expansion slots 904, 906, 908, and 910 are full, only the add-on card in expansion slot 910 is capable of being removed.

Removal of the add-on card in expansion slot 910 will de-actuate switch 917, and retention solenoid 922 will retract its retention member. In this state, an add-on card may be installed into expansion slot 910, which will re-actuate switch 917 and retention solenoid 922, or the add-on card in expansion slot 908 may be freely removed. This will de-actuate switch 916, causing the extension of lockout member 934 of lockout solenoid 928 and the retraction of the retention member of retention solenoid 920.

In another embodiment, instead of sequential access to expansion slots, the solenoids and switches described above may be operatively connected in any pattern of expansion slot access. For example, operatively connecting switch 912 with lockout solenoid 926, switch 916 with lockout solenoid 924, and switch 914 with lockout solenoid 928 will cause the expansion slots to become available, in order, 904, 908, 906, and 910. Any variation of expansion slot availability order is therefore capable, and is within the scope of the invention. Of course, expansion slot 904 may be equipped with an appropriately connected lockout solenoid, and expansion slot 910 may be equipped with an appropriately connected switch and retention solenoid for operation of the expansion slot availability in any chosen order. Further, more or fewer expansion slots may be connected without departing from the scope of the invention.

All solenoid discussed herein are in one embodiment flip flop solenoids. A flip flop solenoid requires only momentary energization to move its movable member, in one embodiment a lockout member or a retention member, from its first position to its second position, or from its second position to its first position. When using flip flop solenoids, power consumption of the embodiment is reduced, as is wear and tear on physical components of the solenoids.

Figure 10:
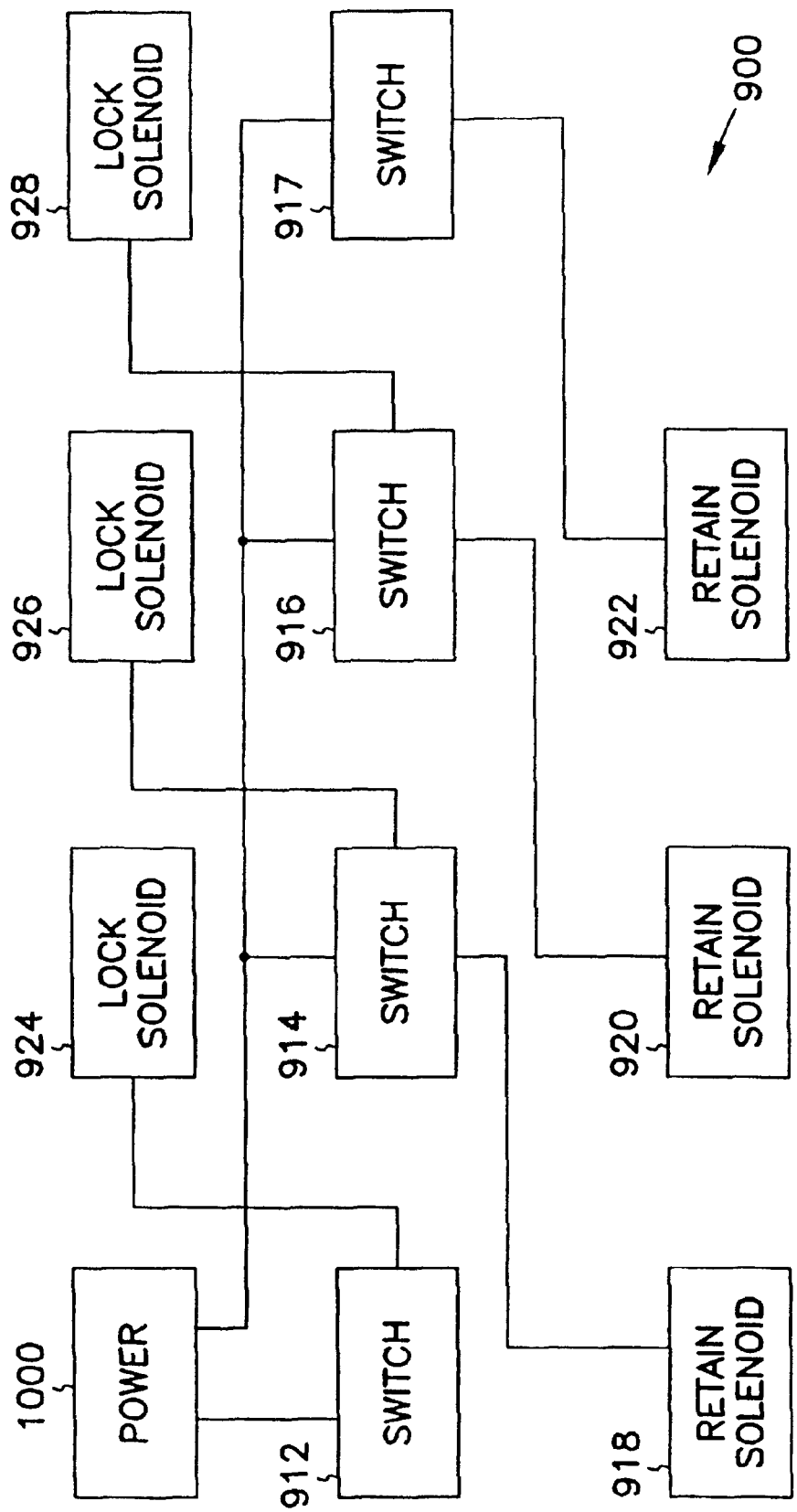
FIG. 10 is a schematic block diagram of the embodiment of FIG. 9.

FIG. 10 is a schematic diagram of the embodiment 900 shown in FIG. 9. Power supply 1000 is connected to switches 912, 914, and 916. When switch 912 is actuated, solenoids 918 and 924 are actuated. When switch 914 is actuated, solenoids 920 and 926 are actuated. When switch 916 is actuated, solenoids 922 and 928 are actuated.

Figure 11:
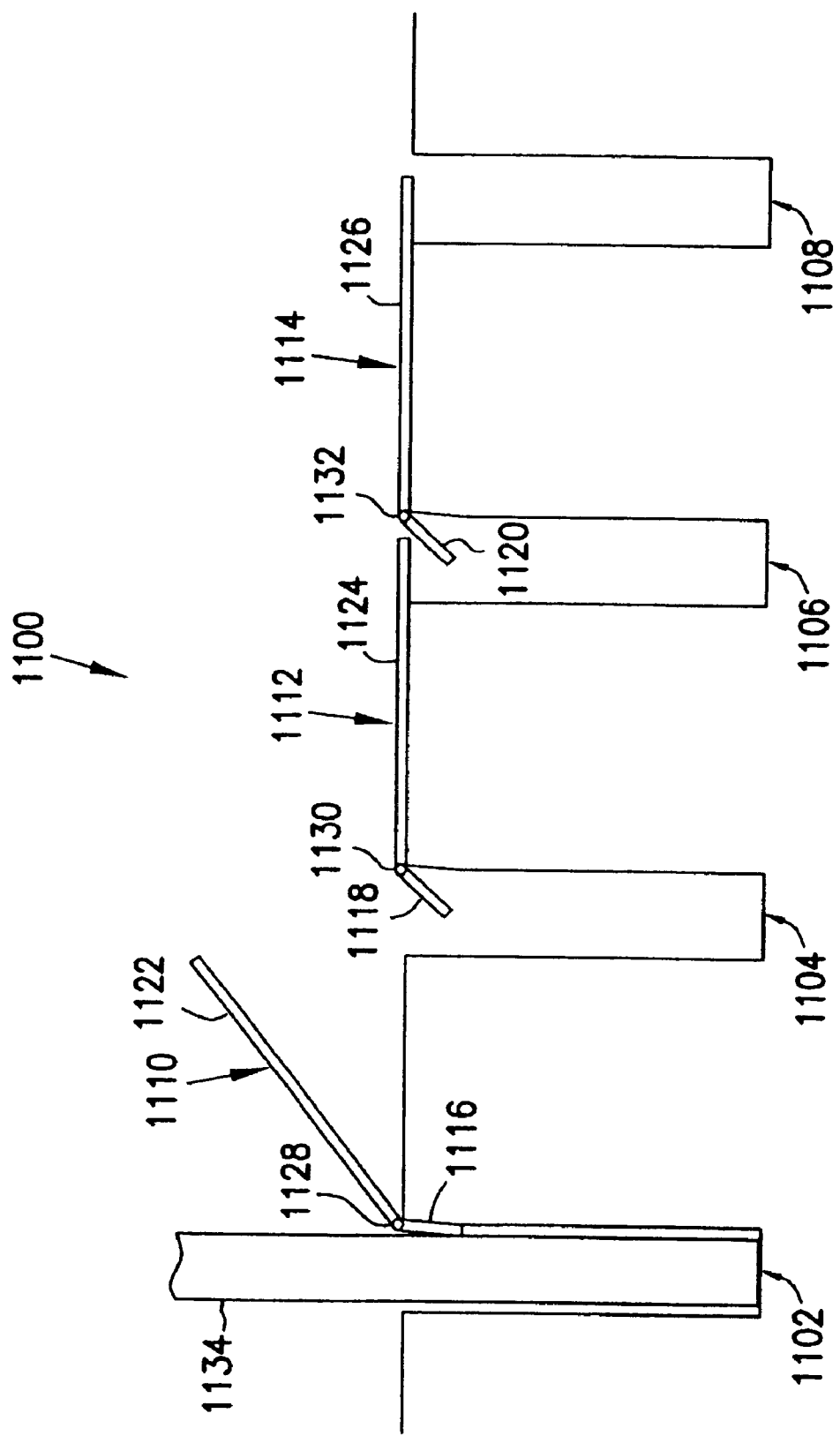
FIG. 11 is a side elevation view of another embodiment of the present invention.

In another embodiment 1100, shown in side elevation in FIG. 11, expansion slots 1102, 1104, 1106, and 1108 are used with lockout mechanisms 1110, 1112, and 1114. Each of the lockout mechanisms comprises a cover arm (1116, 1118, and 1120) and a lockout member (1122, 1124, and 1126), and each lockout mechanism is rotatable about a pivot point (1128, 1130, and 1132) between a first rest position and a second operational position. Lockout members 1122, 1124, and 1126 may be rods, wires, or other members which block access to an expansion slot without departing from the scope of the invention. Lockout mechanism 1110 is shown in operational position with an expansion card or add-on 1134 in place in expansion slot 1102. Lockout mechanisms 1112 and 1114 are shown in their rest positions. When expansion card or add-on 1134 is positioned in expansion slot 1102, the card 1134 pushes down on cover arm 1116. The lockout mechanism 1110 rotates about pivot point 1128, moving lockout member 1122 out of the way of expansion slot 1104, allowing another expansion card or add-on to be inserted into expansion slot 1104.

Lockout mechanisms 1112 and 1114 are shown in lockout positions in which the expansion slots 1106 and 1108 will not accept an expansion card or add-on. In the position shown, expansion alot 1104 will accept an expansion card or add-on since the lockout member 1122 of lockout mechanism 1110 has been removed from blocking the expansion slot 1104 by insertion of the expansion card or add-on 1134 into expansion slot 1102.

In one embodiment, when an expansion card or add-on such as add-on 1134 is removed from an expansion slot, gravity causes the lockout mechanism to rotate about its pivot point, and the lockout mechanism returns to its rest position. This rest position is shown for lockout mechanisms 1112 and 1114 in FIG. 11. In another embodiment, the lockout mechanisms may be biased toward the rest position, so that when an expansion card or add-on is removed from an expansion slot, the lockout mechanism is urged into its rest position.

Figure 12:
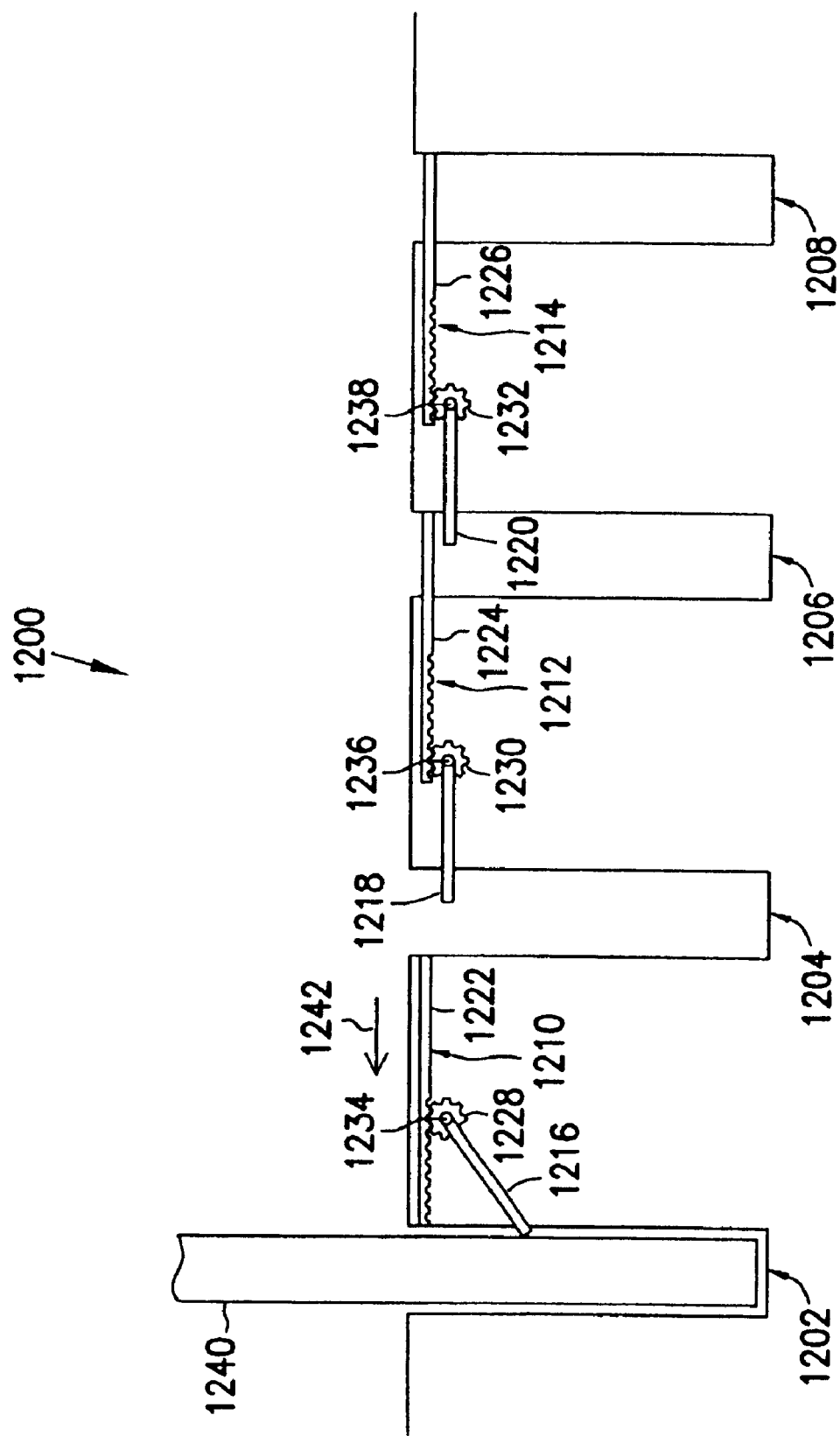
FIG. 12 is a side elevation view of yet another embodiment of the present invention.
Figure 13:
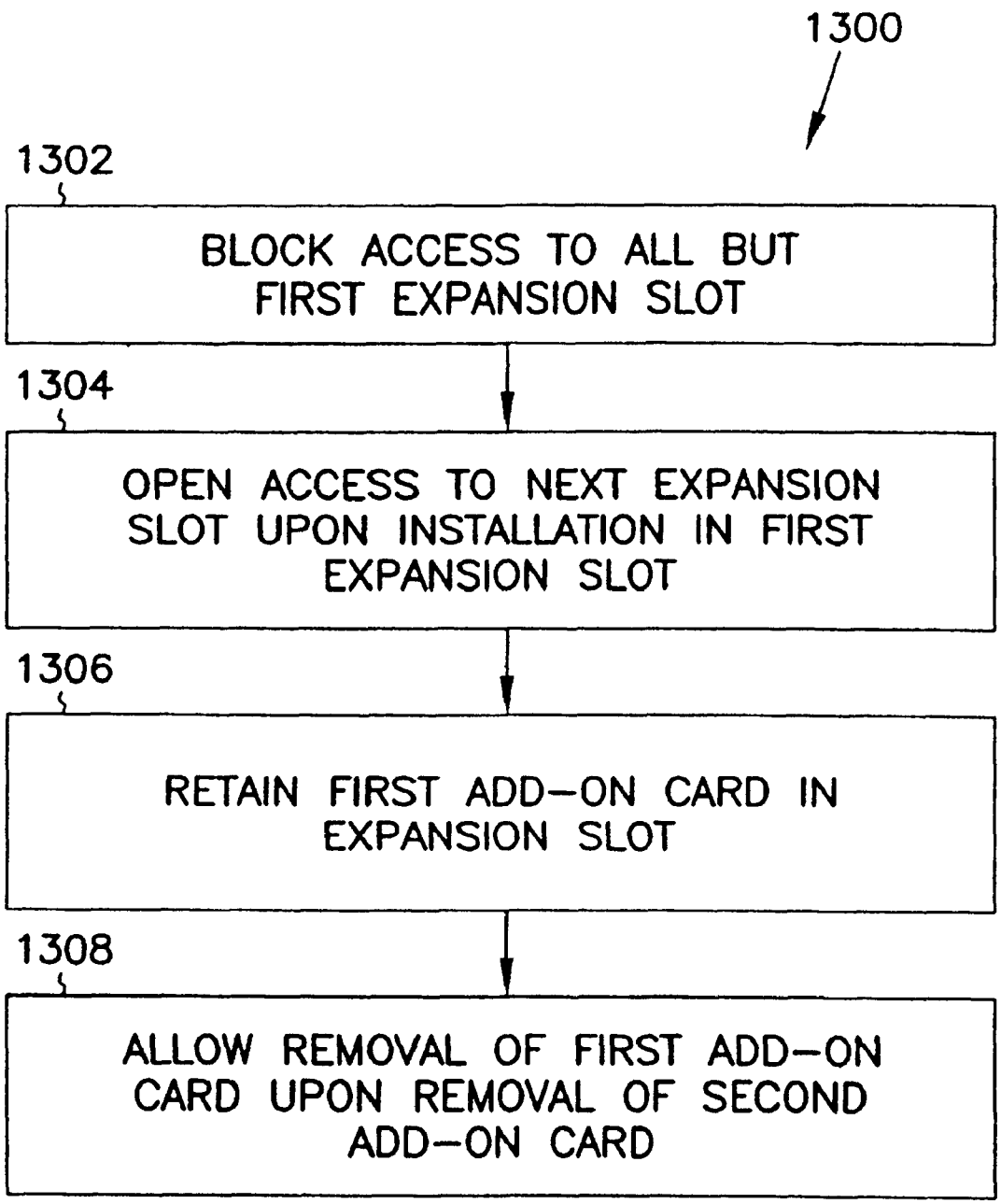
FIG. 13 is a flow chart diagram of a method embodiment of the present invention.

In another embodiment 1200, shown in side elevation in FIG. 12, expansion slots 1202, 1204, 1206, and 1208 are used with lockout mechanisms 1210, 1212, and 1214. Each of the lockout mechanisms comprises a cover arm (1216, 1218, and 1220), a lockout member (1222, 1224, and 1226), and a gear (1228, 1230, and 1232). Each lockout mechanism is rotatable about a pivot point (1234, 1236, and 1238) between a first rest position and a second operational position. Teeth on each gear engage notches or detents in the lockout member. Lockout mechanism 1210 is shown in operational position with an expansion card or add-on 1240 in place in expansion slot 1202. Lockout mechanisms 1212 and 1214 are each shown in their rest position. When expansion card or add-on 1240 is positioned in expansion slot 1202, the card 1240 pushes down on cover arm 1216. The lockout mechanism 1210 rotates about pivot point 1234, moving lockout member 1222 out of the way of expansion slot 1204 through the engagement of the teeth of gear 1228 and the notches or detents of lockout member 1222. Another expansion card or add-on may then be insterted into expansion slot 1204.

Lockout mechanisms 1212 and 1214 are shown in rest or lockout positions in which the expansion slots 1206 and 1208 will not accept an expansion card or add-on. In the position shown, expansion slot 1204 will accept an expansion card or add-on since the lockout member 1222 of lockout mechanism 1210 has been removed from blocking the expansion slot 1204 by insertion of the expansion card or add-on 1240 into expansion slot 1202.

In one embodiment, the gears 1234, 1236, and 1238 are biased in the direction of arrow 1242, so that when an expansion card or add-on is removed from an expansion slot, the lockout mechanism returns to its rest position. The lockout mechanism may be biased in many ways, including by way of example but not limitation, springs including coil, leaf, and spiral springs, gear tension, and the like.

In another embodiment, each of the embodiments discussed above is implemented with a series of light emitting diodes (LEDs) to indicated which of the add-on slots is available for installation of an add-on card. Such a series of LEDs could be actuated by mechanical switches closing to light an LED when the add-on slot is available for installation of an add-on card. Also, LEDs could be used to indicate whether an expansion slot is full, available, locked, or any combination thereof.

Figure 15:
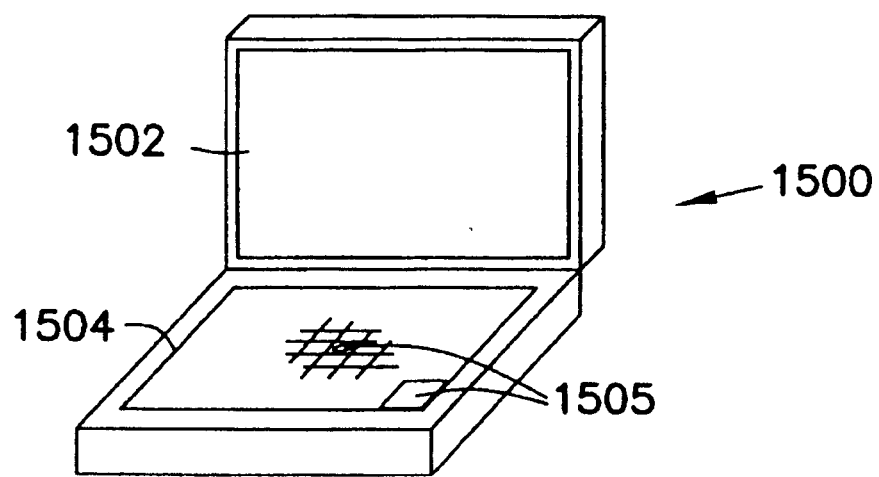
FIG. 15 is a perspective view of a portable computer on which embodiments of the present invention may be utilized.

A method embodiment of the present invention is shown in flow chart diagram in FIG. 15. Embodiment 1500 comprises blocking access to all expansion slots but the first expansion slot of a set of expansion slots in block 1502, and allowing access to the next expansion slot in the set of expansion slots upon installation of an add-on card in the first expansion slot in block 1504. Optionally, the first add-on card may be retained in the first expansion slot upon installation of an add-on card in the second expansion slot in block 1506, and the first add-on card may be made removable from the first expansion slot upon removal of the second add-on card in block 1508.

It may be seen that more complicated lockout mechanisms with different card opening positions or even multiple card openings, as well as different orientations of the various lockout mechanisms, could allow a PCB to employ a scheme in which the expansion slot opening use was chosen in any order. For example, if the expansion slot add-on order is not sequential, the placement, orientation, and configuration of lockout mechanisms could be chosen to allow any order of use for the expansion slots without departing from the scope of the invention.

It should be understood that although four expansion slots are shown in the various embodiments, fewer or more expansion slots may be used without departing from the scope of the invention. It should also be understood that the physical location of expansion receptacles or slots on a PCB are chosen to accommodate the functionality of the lockout mechanism embodiment.

Figure 14:
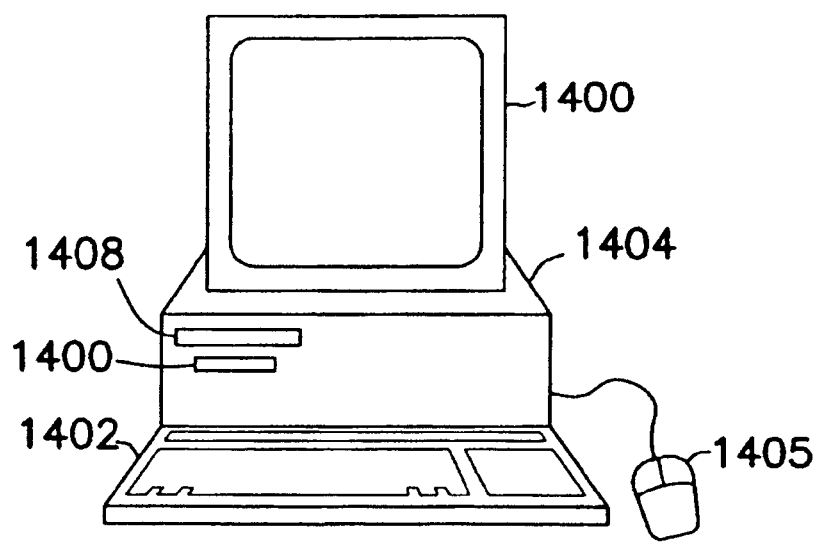
FIG. 14 is a perspective view of a desktop computer on which embodiments of the present invention may be utilized.

Desktop computers, as shown in FIG. 14, typically include a monitor 1400, keyboard input 1402, central processing unit 1404, and a pointing or selection device such as mouse 1405. Further components of a typical computer system may include a machine readable storage media such as disk drive 1406, hard disk, CD-ROM 1408, DVD, modem, and the like. The processor unit of such a computer typically includes a microprocessor, memory (RAM and ROM), and other peripheral circuitry, not shown. Portable or laptop computers, as shown in FIG. 15 include the same features in general as desktop computers, but are smaller, and often comprise a single unit 1500 with integrated display screen 1502 and keyboard 1504, and pointing device 1505 such as a touch pad or trackball. Such computers are some of the types of host devices on which embodiments of the present invention may be employed.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A lockout apparatus for a plurality of expansion slots comprising a first expansion slot, a last expansion slot, and a plurality of intermediate expansion slots, the lockout apparatus comprising:
   a plurality of lockout mechanisms, one lockout mechanism for each of the plurality of intermediate expansion slots and the last expansion slot, each lockout mechanism automatically movable between a first position in which an expansion slot corresponding to the lockout mechanism is blocked, and a second position in which the expansion slot corresponding to the lockout mechanism is open.

2. The lockout apparatus of claim 1, wherein each expansion slot has a lockout channel, and each lockout mechanism comprises:
   a lockout disk rotatable about a central point, the lockout disk having:
   a lockout member fixedly rigidly attached to the lockout disk, the lockout member extending into the expansion slot corresponding to the lockout mechanism;
   a lockout opening aligned with the lockout channel when the lockout member is in the first position;
   a lockout rod rotatably mounted to the lockout disk, the lockout rod extending into the lockout channel and lockout opening of the adjacent expansion slot when the lockout member is in its first position, and movable out of the lockout opening of the adjacent expansion slot when the lockout member moves to the second position.

3. The lockout apparatus of claim 2, wherein each lockout mechanism further comprises a biasing means biasing the lockout mechanism toward the first position.

4. The lockout apparatus of claim 3, wherein the biasing means is a spring.

5. The lockout apparatus of claim 1, wherein the number of expansion slots is four.

6. The lockout apparatus of claim 1, wherein each lockout mechanism comprises:
   a body having a first end and a second end;
   a displacement tab extending from the first end;
   an add-on card opening positioned between the first end and the second end.

7. The lockout apparatus of claim 6, wherein the add-on card opening is a slot extending from one edge into the body.

8. The lockout apparatus of claim 6, wherein the displacement tab is disposed at an angle to the body.

9. The lockout apparatus of claim 6, wherein the number of expansion slots is four.

10. The lockout apparatus of claim 6, wherein each lockout mechanism further comprises a biasing means biasing the lockout mechanism toward the first position.

11. The lockout apparatus of claim 10, wherein the biasing means is a spring.

12. The lockout apparatus of claim 6, further comprising means for retaining an add-on card in the expansion slot when a next add-on card is placed in a next expansion slot.

13. The lockout apparatus of claim 12, wherein the means for retaining comprises a member moveable by the next add-on card into a slot in a previous add-on card.

14. The lockout apparatus of claim 6, wherein the displacement tab engages a slot in an add-on card to retain the add-on card in the expansion slot.

15. The lockout apparatus of claim 1, further comprising a power supply and wherein each lockout mechanism comprises:
   a switch with a contact disposed in a first expansion slot
   a lockout member disposed in a second expansion slot; and
   a lockout solenoid in a second expansion slot, the switch connected between the power supply and the lockout solenoid and forming an expansion slot solenoid connection, wherein actuation of the switch actuates the lockout solenoid to retract the lockout member from the second expansion slot.

16. The lockout apparatus of claim 15, wherein the expansion slot solenoid connections are sequential.

17. The lockout apparatus of claim 15, wherein the expansion slot solenoid connections are non-sequential.

18. The lockout apparatus of claim 15, each of the plurality of intermediate expansion slots and the first expansion slot further comprising:
   a retention solenoid having a retention member movable from a first non-retaining position to a second retaining position for retaining a previous add-on card in the first expansion slot upon installation of an add-on card in the second expansion slot.

19. The lockout apparatus of claim 18, wherein each of the retention solenoids is operatively connected to the switch of a next expansion slot to actuate a retention member of the retention solenoid upon installation of a next add-on card into the next expansion slot.

20. The lockout apparatus of claim 1, wherein each lockout mechanism comprises:
   a body having a first end, a second end, a cover arm at one the first end and a lockout member at the second end, the body rotatable between the first and second positions about a pivot point between the first end and the second end.

21. The lockout apparatus of claim 1, wherein each lockout mechanism comprises:
   a lockout member having a plurality of openings therein;
   a gear having teeth, the gear rotatable about a pivot point, the teeth engaging the plurality of lockout member openings; and
   a cover arm fixedly, rigidly attached to the gear.

22. A lockout apparatus for a plurality of expansion slots comprising a first expansion slot, a last expansion slot, and a plurality of intermediate expansion slots, the lockout apparatus comprising:
   a plurality of lockout mechanisms, one lockout mechanism for each of the plurality of intermediate expansion slots and the last expansion slot, each lockout mechanism automatically movable between a first position in which an expansion slot corresponding to the lockout mechanism is blocked, and a second position in which the expansion slot corresponding to the lockout mechanism is open,
   wherein the lockout mechanism of a next sequential lockout mechanism is moved from the first position to the second position upon installation of an add-on card into the first expansion slot.

23. The A lookout lockout apparatus for a plurality of expansion slots comprising a first expansion slot, a last expansion slot, and a plurality of intermediate expansion slots, the lockout apparatus comprising:
   a plurality of lockout mechanisms, one lockout mechanism for each of the plurality of intermediate expansion slots and the last expansion slot, each lockout mechanism automatically movable between a first position in which an expansion slot corresponding to the lockout mechanism is blocked, and a second position in which the expansion slot corresponding to the lockout mechanism is open,
   wherein when an add-on card is installed into an expansion slot, the lockout mechanism of a next lockout mechanism in a next sequential expansion slot is moved from the first position to the second position.

24. A lockout apparatus for a plurality of expansion slots comprising a first expansion slot, a last expansion slot, and a plurality of intermediate expansion slots, wherein each expansion slot has a lockout channel, the lockout apparatus comprising:
   a plurality of lockout mechanisms, one of the plurality of lockout mechanisms corresponding to one of the plurality of intermediate expansion slots and the last expansion slot, each lockout mechanism comprising:
   a lockout disk rotatable about a central point, the lockout disk having:
      a lockout member movable between a first position in which the expansion slot corresponding to the lockout mechanism is blocked, and a second position in which the expansion slot corresponding to the lockout mechanism is open, the lockout member fixedly rigidly attached to the lockout disk, the lockout member extending into the expansion slot corresponding to the lockout mechanism;
      a lockout opening aligned with the lockout channel when the lockout member is in the first position; and
      a lockout rod rotatably mounted to the lockout disk, the lockout rod extending into the lockout channel and lockout opening of the adjacent expansion slot when the lockout member is in the first position, and movable out of the lockout opening of the adjacent expansion slot when the lockout member moves to the second position.

25. A lockout apparatus for a plurality of expansion slots comprising a first expansion slot, a last expansion slot, and a plurality of intermediate expansion slots, comprising:
   a plurality of lockout mechanisms, one of the plurality of lockout mechanisms corresponding to one of the plurality of intermediate expansion slots and the last expansion slot, each lockout mechanism comprising:
   a lockout member automatically movable between a first position in which the expansion slot corresponding to the lockout mechanism is blocked, and a second position in which the expansion slot corresponding to the lockout mechanism is open, and wherein each lockout member comprises:
      a body having a first end and a second end;
      a displacement tab extending from the first end;
      an add-on card opening positioned between the first end and the second end.

26. A lockout apparatus for a plurality of expansion slots comprising a first expansion slot, a last expansion slot, and a plurality of intermediate expansion slots, comprising:
   a power supply;
   a plurality of lockout mechanisms, one of the plurality of lockout mechanisms for each of the plurality of intermediate expansion slots and the last expansion slot, each lockout mechanism comprising:
      a switch with a contact disposed in a first expansion slot;
      a lockout member movable between a first position in which the lockout member blocks a second expansion slot, and a second position in which the second expansion slot is open;
      a lockout solenoid in the second expansion slot, the switch connected between the power supply and the lockout solenoid, wherein actuation of the switch actuates the lockout solenoid to retract the lockout member from the second expansion slot.

27. A lockout apparatus for a plurality of expansion slots comprising a first expansion slot, a last expansion slot, and a plurality of intermediate expansion slots, comprising:
   a plurality of lockout mechanisms, one of the plurality of lockout mechanisms corresponding to one of the plurality of intermediate expansion slots and the last expansion slot, each lockout mechanism comprising:
   a lockout member automatically movable between a first position in which the corresponding expansion slot is blocked, and a second position in which the corresponding expansion slot is open, and wherein each lockout mechanism comprises:
      a body having a first end and a second end, the body automatically movable between a first position in which the corresponding expansion slot is blocked, and a second position in which the corresponding expansion slot is open, the body having a cover arm at the first end and a lockout member at the second end, and wherein the body is rotatable between the first and second positions about a pivot point between the first end and the second end.

28. A lockout apparatus for a plurality of expansion slots comprising a first expansion slot, a last expansion slot, and a plurality of intermediate expansion slots, comprising:
   a plurality of lockout mechanisms, one of the plurality of lockout mechanisms corresponding to one of the plurality of intermediate expansion slots and the last expansion slot, each lockout mechanism comprising:

a lockout member movable between a first position in which the corresponding expansion slot is blocked, and a second position in which the corresponding expansion slot is open, the lockout member having a plurality of openings therein;

a gear having teeth, the gear rotatable about a pivot point, the teeth engaging the plurality of lockout member openings; and a cover arm fixedly, rigidly attached to the gear.

29. A computer system, comprising:

a computer having a plurality of expansion slots comprising a first expansion slot, a last expansion slot, and a plurality of intermediate expansion slots; and a lockout apparatus for the plurality of expansion slots, the lockout apparatus comprising:

a plurality of lockout mechanisms, one lockout mechanism corresponding to one of the plurality of intermediate expansion slots and the last expansion slot, each lockout mechanism comprising a lockout member automatically movable between a first position in which the corresponding expansion slot is blocked, and a second position in which the corresponding expansion slot is open.

30. The computer system of claim 29, wherein each expansion slot has a lockout channel and wherein each lockout mechanism further comprises:

a lockout disk rotatable about a central point, the lockout disk having:

the lockout member fixedly rigidly attached to the lockout disk, the lockout member extending into the corresponding expansion slot;

a lockout opening aligned with the lockout channel when the lockout member is in the first position;

a lockout rod rotatably mounted to the lockout disk, the lockout rod extending into the lockout channel and lockout opening of the adjacent expansion slot when the lockout member is in the first position, and movable out of the lockout opening of the adjacent expansion slot when the lockout member moves to the second position.

31. The computer system of claim 29, wherein each lockout member comprises:

a body having a first end and a second end;

a displacement tab extending from the first end;

an add-on card opening positioned between the first end and the second end.

32. The computer system of claim 29, further comprising a power supply and wherein each lockout member comprises:

a switch with a contact disposed in a first expansion slot; and a lockout solenoid in a second expansion slot, the switch connected between the power supply and the lockout solenoid, wherein actuation of the switch actuates the lockout solenoid to retract a lockout member from the second expansion slot.

33. A printed circuit board having a plurality of expansion slots comprising a first expansion slot and a plurality of remaining expansion slots, and a lockout apparatus, the lockout apparatus comprising:

a plurality of lockout mechanisms, one lockout mechanism corresponding to one of the plurality of intermediate expansion slots and the last expansion slot, each lockout mechanism comprising a lockout member automatically movable between a first position in which the corresponding expansion slot is blocked, and a second position in which the corresponding expansion slot is open.

* * * * *